Jan. 15, 1952      E. DE F. TIDD      2,582,762
RADIANT HEATING INSTALLATION
Filed Dec. 24, 1949      3 Sheets—Sheet 1
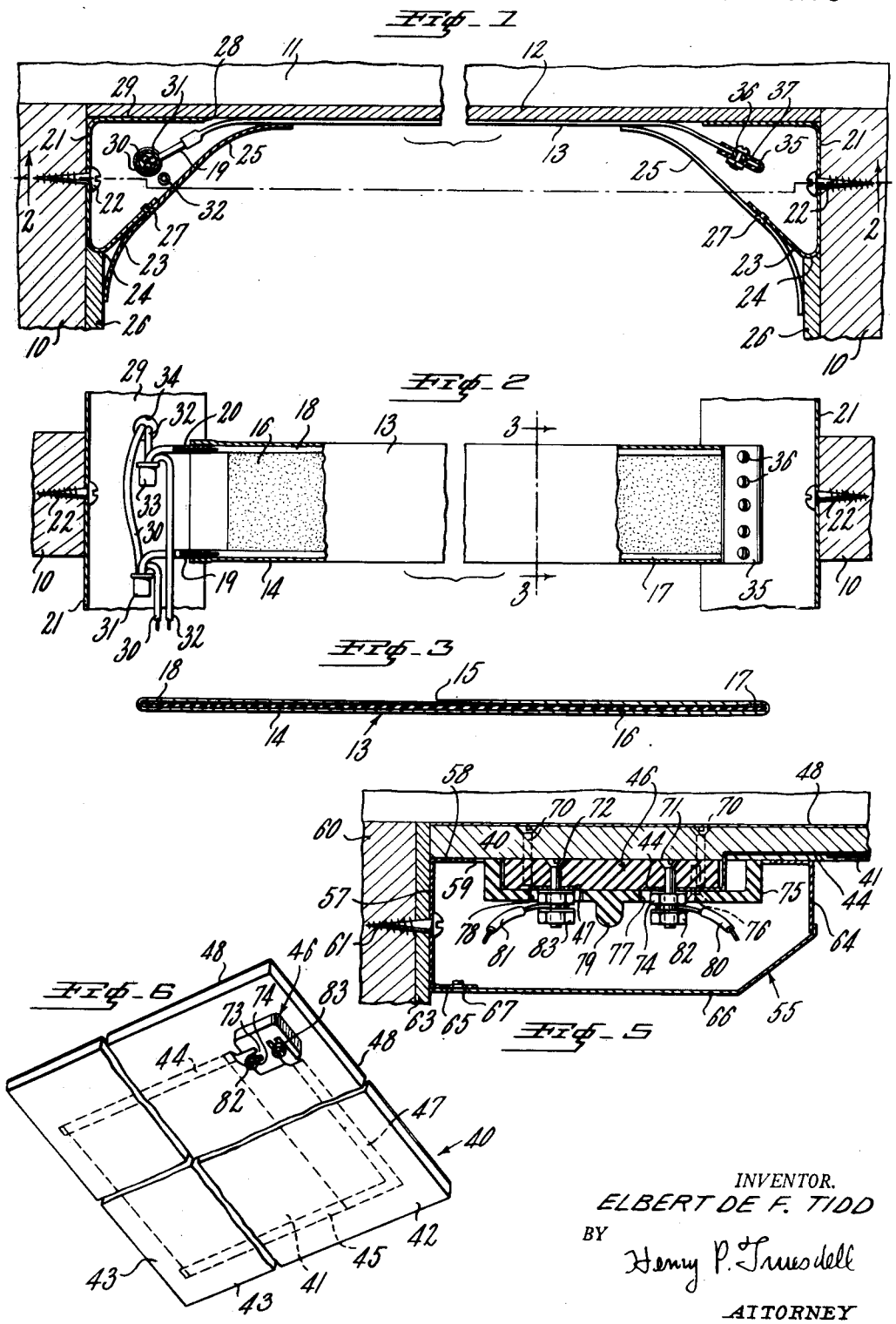
INVENTOR.
ELBERT DE F. TIDD
BY Henry P. Truesdell
ATTORNEY

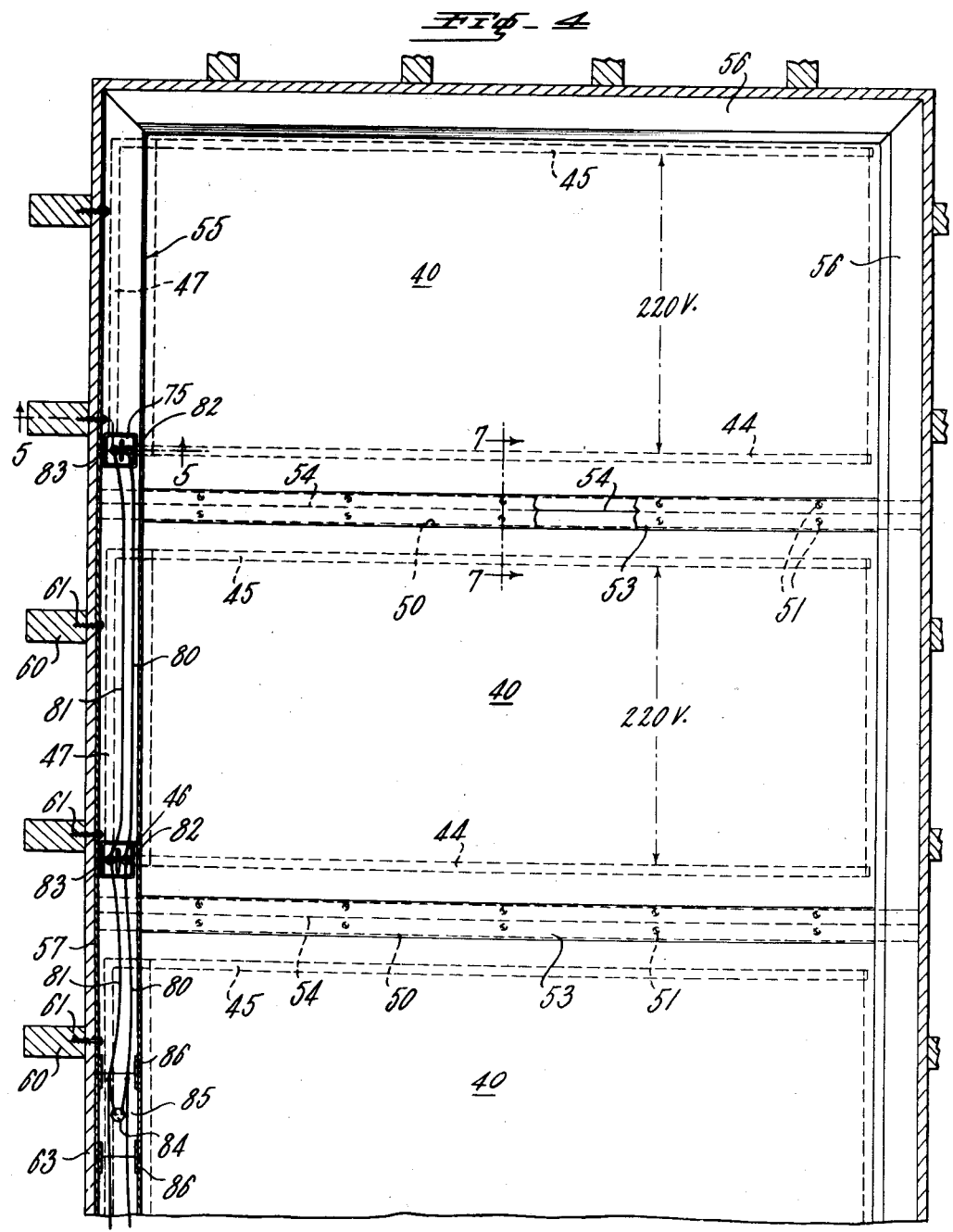

Jan. 15, 1952 E. DE F. TIDD 2,582,762
RADIANT HEATING INSTALLATION
Filed Dec. 24, 1949 3 Sheets-Sheet 3
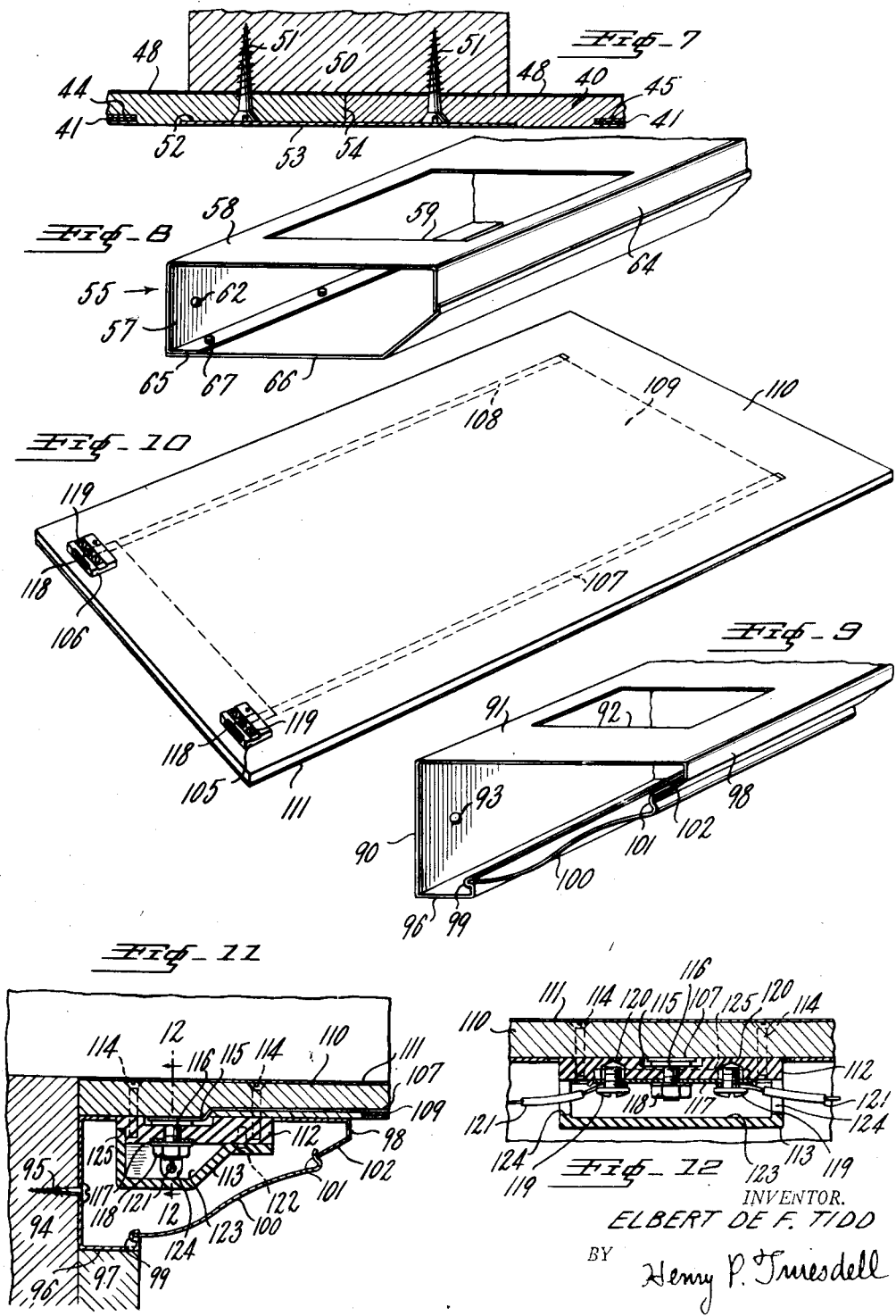
INVENTOR.
ELBERT DE F. TIDD
BY Henry P. Truesdell
ATTORNEY Patented Jan. 15, 1952

2,582,762

UNITED STATES PATENT OFFICE 2,582,762

RADIANT HEATING INSTALLATION

Elbert De F. Tidd, Clinton, N. J., assignor, by mesne assignments, to United States Rubber Company, New York, N. Y., a corporation of New Jersey Application December 24, 1949, Serial No. 134,949

8 Claims. (Cl. 219—19)

1

This invention relates to radiant space heating installations, and more particularly it relates to electrical radiant heating systems which are incorporated in the ceiling or walls of a room. This application is closely related to the Cassidy et al. application Serial No. 184,872 filed September 14, 1950, which issued as Patent 2,569,921 on October 2, 1951, for Radiant Heating Installation, and covering features not herein disclosed. It is also closely related to the Barnes et al. application Serial No. 118,966 filed September 30, 1949, which issued as Patent 2,569,116 on October 2, 1951, for Metal Raceway, and covering a raceway per se.

The invention has among its objects the provision of a convenient means of connecting radiant heating elements to an electrical supply; the provision of safe means for distributing electrical energy to a plurality of radiant heating elements constituting part of a wall or ceiling of a room; the provision of readily accessible electrical connecting means for ceiling panels; the provision on the surface of a room of an assembly of heating panels for heating the room which is efficient yet inconspicuous; the provision of electrical distributing means for such panels which is so designed as to harmonize with the structural details of the room; and the provision of heating panel assembly means permitting easy removal and replacement of the panels.

Other objects of the invention are to provide heating panels including means for conveniently connecting a series of adjacent or spaced panels in parallel; to provide a protective enclosure for radiant heating element connectors and wiring; to provide electrical distributing means for heating panels which is readily adaptable to the architecture or configuration of the particular room being heated; and to provide heating panel assemblies suited to installation over the existing ceiling of an old structure or suited to installation in new structures having no ceiling.

Further objects of the invention include the provision of heating panel installation means that can be conformed to building code requirements and the provision of a heating panel installation which is relatively unaffected by small relative movements of the structural members of a building containing such installation.

Additional objects and advantages of the invention will be made evident in the following detailed description when read with reference to the accompanying drawings, wherein:

Fig. 1 is a sectional elevation of parts of a ceiling and walls of a room showing a radiant heating assembly installed thereon in accordance with the present invention;

Fig. 2 is a partial sectional view of the ceiling installation of Fig. 1, viewed from below, taken substantially along the lines 2—2 of Fig. 1, with certain parts broken away;

Fig. 3 is a sectional view on a larger scale of the radiant heating means employed in the assembly of Figs. 1 and 2, taken along line 3—3 of Fig. 2;

Fig. 4 is a plan view, with parts in section, of part of a ceiling of a room formed of a heating panel assembly embodying a modified form of the invention;

Fig. 5 is a fragmentary sectional elevation on a larger scale of a cove of the room of Fig. 4, taken substantially along lines 5—5 of Fig. 4;

Fig. 6 is a fragmentary perspective view of the heating panel of Fig. 4;

Fig. 7 is a fragmentary sectional elevation along line 7—7 of Fig. 4 showing one manner of attaching the heating panels to the ceiling beams;

Fig. 8 is a perspective view of the cove raceway of Fig. 4 in which electrical connections to the heating panels are made;

Fig. 9 is a perspective view of a modified form of cove raceway;

Fig. 10 is a perspective view of a heating panel carrying modified connector blocks;

Fig. 11 is a fragmentary sectional elevation of a cove of a room showing the modified raceway of Fig. 9 and the modified panel of Fig. 10 in assembled relation; and Fig. 12 is a fragmentary sectional view of the assembly of Fig. 11, taken along line 12—12 of Fig. 11.

Referring to Fig. 1 of the drawings, the room represented therein is constructed with the usual upright studs 10 in the walls and horizontal beams 11 running transversely thereof in the ceiling. A ceiling 12 of wall board, plaster, or other suitable material is attached to the undersurface of the ceiling beams 11. An electrical heating member 13 in the form of an elongated strip is applied to the surface of the ceiling 12 by suitable means, as by cementing, and extends across the ceiling from one side of the room to the other. Such heating strip 13, as indicated in Figs. 2 and 3, may comprise an outer cover or envelope 14 of flexible insulating material that is resistant to elevated temperature, for example a woven cotton-asbestos fabric. Such fabric is folded over and suitably joined, as by cementing, at a seam 15 (Fig. 3) on the upper face of the cover 14, and encloses an electrically conductive heating element, such as a film or layer of conductive composition 16, e. g., a composition comprising a dispersion of finely divided conductive material, such as conductive carbon black, in a plastic medium, such as rubber. Heating elements of this general character are disclosed in U. S. Patent 2,314,766 to A. W. Bull et al.

For the purpose of feeding electric current to the conductive layer 16, metallic tapes 17 and 18 are disposed within the edges of the insulating cover 14 along each longitudinal edge of the layer 16 in electrical contact therewith. At one end of the heating strip 13, shown as the left-hand end in the drawing, insulated feed wires 19 and 20 pass into the interior of the envelope 14 and are electrically connected, as by soldering, to the ends of the distributing tapes 17 and 18.

A cove raceway comprising an angular metal channel member 21 is installed at each end of the heating strip 13 at the intersection of the wall and ceiling for the purpose of receiving the free ends of the strip 13 and for carrying the electrical wiring thereto. The channel 21 may be fastened to the studs 10 in the wall of the room by means of screws 22 passing therethrough. A lower portion 23 extends upwardly and forwardly at an angle from the lower edge or face 24 of channel 21 and engages a removable cover member 25 on the front of the raceway. Such cover member may have a generally arcuate shape, fitting neatly within the corner of the room, engaging the plaster wall 26 of the room at its lower extremity and engaging the heating strip 13 at its upper extremity. The lower edge 24 of the channel 21 may serve as a guiding ledge for application of plaster comprising a room wall 26, or the wall 26 may be made of wall board, etc., applied either before or after the channel 21 is installed.

The cover 25 may be removably fastened to the lower channel portion 23 by means of screws 27 threaded therethrough. The channel 21 and cover 25 form a raceway for electric wires and connections, such raceway having a longitudinally extending top opening 28 defined by a horizontal upper wall 29 of the channel 21, and the upper extremity of the cover 25. A portion of the flexible radiant heating strip 13 passes through the opening 28 into the raceway thus formed.

The insulated feed wires 19 and 20 pass out of the end of the heating strip 13 into the raceway. One such wire 19 is electrically connected to a supply wire 30 within the raceway by means of a twist connector 31, while the other such wire 20 is electrically connected to a supply wire 32 by means of another twist connector 33 to complete the electrical circuit. The supply wires 30 and 32 pass into the raceway from the building wiring system through an opening 34 (Fig. 2) provided in the top wall 29 of the raceway for this purpose. The supply wires 30 and 32 may continue from the wire connectors 31 and 33 to the next heating strip in the system, it being understood that the system may comprise any desired number of strips 13 disposed adjacently or suitably spaced along the ceiling of the room. If desired, the heating element 13 may be concealed by embedding in a layer of plaster (not shown), or covered with wall board or similar covering.

The opposite end of the heating strip 13 (the end of the strip shown at the right-hand end in the drawing) is provided with an electrically insulating cap such as a plastic strip 35 enclosing the end of the strip 13, such covering cap being necessary because the conductive layer 16 and feed tapes 17 and 18 extend to the right-hand end of the strip 13, and might become grounded or shorted if the end of the strip was not protected. The cap 35 may be held in position by small bolts 36 passing through holes in the assembly and protected from electrical contact therewith by sleeves 37 of insulating material.

In operation, electric current supplied by wires 30 and 32 within the raceway channel 21 passes, by means of the feed wires 19 and 20, into the longitudinal distributing tapes 17 and 18 within the heating strip assembly 13. The layer of conductive rubber 16 disposed within the insulating envelope 14 completes the circuit across the tapes 17 and 18, with the result that the desired radiant heat is produced therein by reason of the resistance to flow of current offered by the conductive rubber film 16. The radiant heat thus produced is emitted from the surface of the strip 13 and is absorbed by occupants and objects in the room. The electrical circuit includes the usual thermostat and switch (not shown) for controlling the heating to provide the desired room temperature and for turning the system on and off.

In another form of the invention, shown in Figs. 4 to 8, the ceiling of a room comprising a row of electrical radiant heating panels 40 (Fig. 4), arranged adjacently and extending from one side of the room to the other so as to cover the entire ceiling and display an unobtrusive, flush appearance.

Fig. 6 is a perspective view of one of the panels 40, containing an electrical heating element comprising a layer or film of electrically conductive rubber 41 embedded in the interior of a composition building board 42 and spaced from the edges thereof to leave a nonconducting marginal area 43 through which nails or screws may be driven without fear of shorting or grounding the electrical circuit. Embedded feed tapes 44 and 45 of conductive material, such as copper or aluminum strips, engage the longitudinal edges of the conductive layer 41 for passing electric current therethrough. An end of one longitudinal feed tape 44 is brought out of the front surface of the panel and is bent over the surface of a connector block assembly 46, made of suitable insulating material. The remaining longitudinal feed strip 45 is connected to an embedded transverse conductive strip 47, the end of which emerges from the panel to engage the surface of the connector block 46. The back or rear face of the panel is preferably provided with a thin sheet of highly heat-reflective material such as aluminum foil 48 to reflect heat back into the room and thereby increase the heating efficiency of the panel, giving a lower operating temperature therein for a given heat output.

The panels 40 are fastened to ceiling beams 50 (Fig. 4) of the room by means of spaced screws 51 passing through the non-conductive marginal areas 43 of the panel into the beams as indicated in Fig. 7. In order that the panels may present a perfectly smooth, flush appearance suited for the application of plaster, paint, wallpaper, cloth, or other desired decoration, the marginal edges of the panels through which the screws 51 are passed are slightly recessed as indicated at 52 (Fig. 7), and a thin finishing strip 53 of paper, cloth, cement, or other suitable material is applied to the recess 52 covering neatly the joints 54 between adjacent panels as well as the heads of the screws.

For the purpose of associating electrical feed lines with the panels 40 there is provided along at least one edge of the row of panels a raceway, such as an angular metal channel 55, suitably made in the decorative form of a cove molding. The remaining edges of the row of panels are similarly covered with a cove molding 56 of similar external appearance, which however need not necessarily be a raceway capable of accommodating electrical connections.

The angular raceway 55, as shown in perspective in Fig. 8, has a back wall 57 adapted to rest against the side wall of the room, and a top wall 58 adapted to rest against the ceiling. It is adapted to fit in the corner of the room against a marginal edge of the panels 40 at the junction of the wall and ceiling of the room, as indicated most clearly in Fig. 5. The top wall 58 of the raceway contains spaced openings 59, which may be cut therein at the time of manufacture of the raceway, or which may be provided for in the form of knock-outs, or such openings may be cut in the position desired at the time the raceway is installed. As will appear hereafter, the purpose of the openings 59 is to provide for an electrical connection to the panel.

The raceway 55 may be fastened to studs 60 of the room wall by screws 61 (Figs. 4 and 5) passing through holes 62 (Fig. 8) in the back wall 57 of the raceway. As represented in Figs. 4 and 5, the studs 60 of the room may be covered with conventional lathing and plaster, or a wallboard 63, such as insulating board, to conserve heat.

A vertical ledge 64 (Figs. 5 and 8) depends from the front edge of the top wall 58 of the raceway 55, such ledge serving as a guide for the application of a layer of plaster (not shown) or other covering to the ceiling, if such is desired.

Extending forwardly from the lower edge of the back wall 57 of the raceway is an extension or flange 65. A cover plate 66 engages the flange 65 and is removably secured thereto by means of sheet metal screws 67. The forward portion of the removable cover plate 66 is bent upwardly to simulate a decorative molding, and engages the depending ledge 64 on the front of the raceway. The cover 66 forms with the walls 57 and 58 a complete enclosure for the electrical wiring and connections therein. The cover plate 66 may have any desired suitable ornamental shape.

Turning now to the details of construction of the connector block assembly 46 for making the necessary electrical connections to panels, and referring particularly to Fig. 5, the insulating block 46 is secured to the front face of the heating panel 40 near one corner thereof by means of screws 70 threaded through the back of the panel into the block. Terminal screws 71 and 72 pass through from the rear of the block and emerge from the front surface thereof. The end of longitudinal feeding tape 44 emerging from the panel is bent over the face of the block, and such end is provided with a slot 73 (Fig. 6) through which terminal screw 71 passes. A nut 74 threaded onto terminal screw 71 maintains the tape 44 in firm electrical contact with the terminal screw. In a similar manner the end of the transverse feeding strip 47 is connected to terminal screw 72. The face of the connector block 46 is slightly recessed locally to accommodate the feeding strips 44 and 47 as indicated in Fig. 5.

The terminal block 46 is provided with a cooperating cap or cover piece 75 of insulating material, which is adapted to fit over the block 46, being secured thereto by means of a screw 76 as shown in Fig. 5. The terminals 71 and 72 project through holes 77 and 78 provided in the front face of the cover for this purpose. The cover may be provided with a transversely extending projecting ridge 79 to increase its mechanical strength and for providing an insulating barrier between the terminal screws. The cover 75 encloses and insulates the portion of the connecting tapes 44 and 47 which are outside of the panel, and would otherwise be exposed within in the raceway. The opening 59 in the top wall 58 of the raceway, through which the connector block 46 and cover 75 extend, is made somewhat wider than, and somewhat elongated with respect to the cover 75, to permit during installation moderate adjustments in the position of the panel with respect to the raceway.

After the panels 40 are assembled in position in the ceiling as shown in Fig. 4 and a raceway 55 is applied to the cove, electrical connections may be made to the terminal block assemblies 46, which extend through the openings 59 in the top of the raceway, by means of insulated electric wires 80 and 81 connected to terminal screws 71 and 72 on the terminal blocks and secured thereto by nuts 82 and 83. In this way the series of heating panels 40 is electrically connected in parallel across the feed lines.

The electric feed wires 80 and 81 may be passed into the raceway 55 through an opening 84 (Fig. 4) in the top wall thereof, such opening conveniently being provided in a relatively short connecting section, or terminal box section 85 of the raceway. The connecting section 85 of the raceway may have the same external configuration as the main portion 55 of the raceway and may be connected thereto by short internal bridging members 86 suitably fastened frictionally, or by screws or other means.

The usual metallic sheathed cable (not shown) may be employed to bring the wires 80 and 81 from the main electric circuit of the building up to the opening 84 in the raceway, such cable being fastened at the opening 84 by the usual conventional connector assembly (not shown). The electrical heating circuit again includes the usual thermostat and switch (not shown).

Fig. 9 shows a modified form of raceway for enclosing electrical wiring and connections for heating panels, simulating a cove molding. The raceway is comprised of an angular piece having a back wall 90 adapted to rest against the side wall of the room, and a top wall 91 adapted to rest against the ceiling. The top wall 90 again contains spaced openings 92 for receiving electrical connector means from the heating panel. Screw holes 93 are provided on the back wall of the raceway for fastening the raceway to studs 94 in the wall of a room by means of screws 95, as indicated in Fig. 11.

A horizontal ledge 96 projects from the bottom of the rear wall 90 of the raceway, serving as a guide for application of the usual layer of plaster 97 (Fig. 11) or other finishing material to the wall of the room. A vertical ledge 98 depends from the front edge of the top wall 91 of the raceway, such ledge also serving as a guide for the application of a layer of plaster (not shown) or other covering to the ceiling such as canvas, if such is desired.

Extending upwardly from the forward edge of the horizontal plaster ledge 96 on the bottom of the raceway, is a curved lip 99. This lip is adapted to engage frictionally a lower edge of a curved snap-on cover 100, which has along its upper edge a similarly curved lip 101 adapted to engage frictionally the lower edge of a portion 102 slanting inwardly from the vertical plaster ledge 98 on the top of the raceway. By this arrangement the cover 100 may be snapped into or out of place easily to give access to the electrical wiring and connections within the raceway. The snap-on cover 100 may have any desired suitable ornamental shape.

While the ceiling heating panel 40 shown in Fig. 6 may be associated with the modified channel of Fig. 9 in the manner indicated in Fig. 4, this modified channel is illustrated in Fig. 11 in combination with a somewhat modified form of ceiling panel of the character indicated in Fig. 10. The panel of Fig. 10 is of generally similar construction to that of Fig. 6, but is provided with two terminal blocks 105 and 106 of modified form, which serve for making electrical connections to embedded longitudinal feeding tapes 107 and 108 associated with a conductive rubber film 109 embedded in the central area of a building board panel 110 in the manner previously indicated. The panel is backed with a sheet of aluminum foil 111.

The terminal block 105, best seen in Figs. 11 and 12, comprises a base member 112 and a cover member 113 of insulating material. The base member 112 is secured to the panel, as by means of screws 114. The conductive feeding tape 107 is brought to the surface of the panel 110 behind the base block 112 into a recess 115 provided in the central portion of the back of the base block for this purpose. A metal bolt 116 contacts the feeding tape 107 in the recess 115, and extends therefrom through the block 112 and out of the front face thereof. A conductive terminal strip 117 on the front face of the block 112 is secured to the bolt 116 by means of a nut 118. The terminal strip 117 is provided with two terminal screws 119 (Fig. 12) threaded therethrough and passing freely into recesses 120 provided in the block 112 for this purpose. An electrical feed wire 121 from the building wiring system may be connected to one of the terminal screws 119 while the remaining terminal screw is connected to a feed wire leading to the adjacent panel. The panel circuit is completed through the remaining terminal block assembly 106 which is connected to a second feed wire leading from the building wiring system. This second feed wire may continue from the block 106 to a corresponding block on an adjacent panel. Thus, the terminal blocks 105 and 106 afford a convenient means of connecting a number of panels in parallel.

To substantially enclose the electrical connections of the terminal block the cap or cover 113 may be secured thereto by means of a screw 122 (Fig. 11). The cover defines an enclosed chamber 123 shaped to accommodate the connecting members, and is provided with holes 124 on each side through which the electrical feed wires pass. A projecting lip or stud 125 on the back wall of the cover 113 engages a correspondingly shaped recess in the back edge of the base block 112 to aid in correctly positioning the cover on the block.

From the foregoing, it is evident that the invention provides a radiant heating installation in which electrical connections can be made to the heating elements conveniently, it being unnecessary to get behind the ceiling or wall of the room to make such connections because a raceway having a removable cover is provided for the electrical wiring. The resulting installation is safe because the wires and connections are enclosed within a protective raceway.

The form of the raceway may be easily adapted to application to various points on a room surface, whether on a wall or a ceiling, and the raceways may be designed either to be inconspicuous so that the heating installation is not evident on casual observation or the raceways may have an ornamental appearance to fit in with the decorative or architectural scheme of any particular type of room or building. The raceway may be manufactured in standard lengths which are cut to size, if necessary, and assembled together at the time of installation.

The provision of terminal blocks on the panels in the manner described makes it possible to connect conveniently virtually any desired number of panels with the enclosed wiring system, and permits great flexibility in the placement or disposition of the panels, which may be applied to the entire surface of a room, or applied at spaced points on the surface of a room, depending on the effect desired. The provision of elongated openings on the raceway for receiving such terminal blocks permits adjustable placing of the panels, with consequent convenience of installation.

The system is equally adaptable to use in new constructions, or to installation in old buildings without destroying or extensively reconstructing the present walls or ceilings.

The raceway installation assembly is particularly well adapted to ceiling installations, which represents the most advantageous manner for utilizing radiant heating, because the radiant heat is normally most effectively distributed from the ceiling without undesirable convection effects. Placement of the raceway in a cove of the ceiling permits installation of full ceiling coverage in such a way as to produce an unobtrusive appearance.

Inspection of the wiring for possible defects, or repair or replacement of the wiring is easily accomplished because access to the wiring is had by simply removing the cover of the enclosing raceway.

Having thus described my invention, what I claim and desire to protect by Letters Patent is:

1. A radiant heating structure comprising an angular raceway having a top horizontal wall and a vertical side wall and adapted to fit at the junction of a wall and ceiling of the room, the top wall of the raceway having spaced openings therein, electrical radiant heating ceiling panels extending from the raceway and covering the openings therein, electrical connecting means extending into the raceway from the panel at the said openings, and a snap-on cover cooperating with the top wall and side wall of the raceway so that the raceway constitutes an essentially complete enclosure.

2. In a radiant heating system, the combination of a metal raceway adapted to be attached to a room structure, an electrical radiant heating panel extending from said raceway, an insulated terminal block on said panel, an electrical connecting means on said terminal block for feeding electrical energy to said panel, said raceway having an opening, and said terminal block extending into the interior of said raceway at said opening.

3. A raceway for enclosing electrical conductors feeding a multiplicity of heating panels applied to the ceiling of a room comprising an angular channel having a top horizontal wall and a vertical back wall and adapted to fit at the junction of a wall and ceiling of a room, spaced openings in the top wall of said raceway for receiving electrical connecting means projecting from the heating panels, an additional opening for passing an electrical supply line into the raceway, and a removable cover on the front of the raceway cooperating with said top wall and back wall thereof to constitute an essentially complete enclosure for electrical conductors therein.

4. In combination with heating panels, a raceway for enclosing electrical conductors feeding a multiplicity of heating panels applied to a ceiling of a room comprising an angular channel having a top wall and a back wall and adapted to fit at the junction of a wall and ceiling of a room, a plaster ledge extending outwardly from the bottom of said back wall, and an opening in the top wall of said raceway for receiving electrical connecting means of a heating panel.

5. In an electrical panel heating system installed on a room surface, a raceway for enclosing electrical conductors feeding power to the panels comprising an angular channel having top and back walls adapted to fit at the junction of the wall and ceiling of a room against the panel, an opening in a wall of the raceway for receiving electrical connecting means of a heating panel, a ledge extending outwardly from said back wall to form an abutment for a finishing material to be applied to the room wall, a second ledge extending downwardly from said top wall to form an abutment for finishing material to be applied to the room ceiling, and a removable cover extending across the opening between said ledges and cooperating with said top and back walls to form an enclosure for the electrical conductors.

6. In a radiant heating construction, the combination of a panel having an electrical radiant heating element embedded therein and an insulating block fastened to a face of the panel near an edge thereof said block having a recess in its rear face abutting the face of the panel, a conductive feeding strip within the panel for said heating element, said feeding strip passing out of the face of the panel behind said block and extending into said recess, and a terminal on said block engaging said feeding strip and passing out of the front face of the block for making an electrical connection thereto.

7. In a heating system for a room having side walls and an adjoining ceiling wall, the combination of a heating panel adapted to be fastened to one of the walls, a metallic raceway having surfaces adjoining at an angle and being located at the junction of the walls with one of said surfaces overlying said panel, said raceway being provided with an opening in said one surface and a connector block carried by said panel and extending through said opening into said raceway for making an electrical connection to the panel.

8. A radiant heating assembly comprising, in combination, an enclosing metallic raceway comprising an angular channel having top and back walls adapted to fit into the junction of the ceiling and wall of a room respectively, the top wall being formed with an opening, the back wall being provided with an outwardly extending ledge to form an abutment for finishing material applied to the room wall, an electrical radiant heating element adapted to be applied to the room ceiling with a portion thereof extending across said opening, and an electrical connection extending into the interior of said raceway through said opening for making an electrical connection to the heating element.

ELBERT DE F. TIDD.

REFERENCES CITED

The following references are of record in the file of this patent:

UNITED STATES PATENTS

| Number | Name | Date |
|---|---|---|
| 567,248 | Meek | Sept. 8, 1896 |
| 800,053 | Ayres | Sept. 19, 1905 |
| 1,825,010 | Murphy | Sept. 29, 1931 |
| 2,018,293 | Williams et al. | Oct. 22, 1935 |
| 2,038,115 | Keller | Apr. 21, 1936 |
| 2,314,766 | Bull et al. | Mar. 23, 1943 |

FOREIGN PATENTS

| Number | Country | Date |
|---|---|---|
| 309,093 | Great Britain | Apr. 5, 1929 |
| 598,910 | Great Britain | Mar. 1, 1948 |
| 225,310 | Switzerland | Apr. 16, 1943 |